United States Patent
Burgess

[19]

[11] Patent Number: 5,996,659
[45] Date of Patent: Dec. 7, 1999

[54] MATCHED PAIR OF PLYWOOD EDGE-BANDING ROUTER BITS

[76] Inventor: Michael Burgess, Box 32, Ripton, Vt. 05766

[21] Appl. No.: 09/004,812

[22] Filed: Jan. 9, 1998

[51] Int. Cl.[6] .............................. B27C 1/00; B27C 5/00; B27F 1/00
[52] U.S. Cl. .................. 144/347; 144/134.1; 144/135.2; 144/91; 144/92; 144/218; 144/231; 144/237; 144/355; 144/228; 409/213; 409/234
[58] Field of Search ................................ 407/28, 29, 30, 407/31, 32, 33; 144/90.1, 91, 91.2, 3.1, 134.1, 135.2, 218, 231, 233, 236, 237, 253.2, 240, 344, 345, 346, 347, 355, 373; 409/234, 232, 205, 213

[56] References Cited

U.S. PATENT DOCUMENTS

| | | | |
|---|---|---|---|
| 71,817 | 12/1867 | Temples | 144/236 |
| 283,678 | 8/1883 | Steele | 144/236 |
| 1,014,794 | 1/1912 | Weirbach | 144/231 |
| 1,172,776 | 2/1916 | Engler | 144/231 |
| 3,718,958 | 3/1973 | Brucker | 144/218 |
| 4,820,091 | 4/1989 | Koski . | |
| 4,860,809 | 8/1989 | Cotton . | |
| 4,993,465 | 2/1991 | Cotton . | |
| 5,215,134 | 6/1993 | Gudeman . | |
| 5,433,563 | 7/1995 | Velepec | 144/231 |
| 5,615,718 | 4/1997 | Venditto . | |

FOREIGN PATENT DOCUMENTS 2256807  9/1975  France ..................................... 144/231

OTHER PUBLICATIONS

LRH Enterprises Inc 6961 Val Jean Ave. Van Nuys, California 91406.

Amana Tool Corp 120 Carolyn Blvd. Farmingdale, New York 11735.

Charles G. Schmidt & Co. Inc 301 West Grand Ave. Montvale, NJ 07645 1–800–724–6438.

DML Industrial Products PO Box 788 620 23rd St. NW Hickory, North Carolina 704 322–4266.

*Primary Examiner*—W. Donald Bray
*Attorney, Agent, or Firm*—Theodore R. Touw

[57] ABSTRACT

A matched pair of two rotatable cutting tools (bits) is adapted to be individually chucked into a common router. Each of these two cutting tools includes a shaft with a removable nut, two or three cutters, one or two bearings, and suitable shims. A first bit has cutters shaped to remove material from the edge of a planar wooden article such as plywood that requires a finished appearance, to form a preferably rounded concave dado in the plywood edge. A second bit has cutters shaped to form a mating wood insert having a preferably rounded convex shape that matches the contour of the concave dado in the plywood edge. The mating wood insert is glued into the dado in the plywood to complete the finished edging.

25 Claims, 5 Drawing Sheets

MATCHED PAIR OF PLYWOOD EDGE-BANDING ROUTER BITS

FIELD OF THE INVENTION

This invention relates generally to wood-working tools, and more particularly to a matched pair of router bits for edge-banding plywood, natural wood, or other wood products.

BACKGROUND OF THE INVENTION

Plywood and other wood products often have edges that require finishing to improve their appearance and durability. Finishing the exposed edge of plywood has been a problem with unsatisfactory solutions since plywood was invented. Up to now, three main methods have been used to accomplish this task. One method has been to apply edge-banding which is covered with a glue, such as hot-melt-glue. For commercial applications of this method, the requisite equipment has been expensive and takes up considerable floor space. Edge-banding with a hand-held heating iron has been time-consuming. Commercial edge-banding material purchased for this method has been expensive and has required extensive inventories. The result of this method has not been satisfactory because the edge is not as durable as desired. In using the plywood, dragging items across the face of the edged plywood often results in failure of the glue or splintering of the edge-band. This may occur because the edge-band comes flush to the top and bottom surfaces of the plywood and is therefore exposed to physical damage.

A second method has been to apply a plastic T-mold into a machined slot. T-mold has had all of the problems of the first method and, in addition, can detract from the appearance of the finished product because it is not natural wood. The traditional solution has been to add a strip of wood to the edge of the plywood. This strip could be applied by using biscuits or, more commonly, by simply nailing. Although this method uses material already available, a particular problem with this method has been the finished appearance. Whether the finish is natural, stained, or painted, the joint between the wood piece and the plywood is visible, principally because it is on the surface.

Among a number of patents, U.S. Pat. No. 4,820,091 to Koski shows a rotary cutting tool for forming complementary wavy joint surfaces in the edges of panels to be mounted in adjacent relationship to each other. A single tool can form both of the edges. U.S. Pat. No. 4,860,809 to Cotton et al. shows a device and method for producing workpieces with alternating-contour mating surfaces. Cutting is done by rotating the working tool and displacing it relative to the workpiece. Guidance of the tool is provided by a base member which has a substantially flat surface and a second surface spaced transversely from it. The second surface has two surface portions offset to one another in a transverse direction. U.S. Pat. No. 4,993,465 to Cotton et al. shows a router tool and method for producing workpieces with alternating-contour mating surfaces. The routing tool has a working portion having an axis and an outer contour shaped so that in an axial cross-section of the working portion the outer contour includes straight lines arranged in a consecutive order and each extends in a direction substantially along the axis. The angle of the straight line portions is preferably at most 20° with the axis. U.S. Pat. No. 5,215,134 to Gudeman shows a matched edge jointer used with a router to produce matched edge surfaces of two workpieces. The guide contains an elongated guide bar, an elongated platform mounted and centered longitudinally under the guide bar, an elongated base adjustably mounted under the platform, and means for adjusting the gap between the platform and the base. The two workpieces are alternately worked using opposite sides of the jointer. U.S. Pat. No. 5,615,718 to Venditto shows a one-piece cutting tool designed to cut both a rail and stile. The top portion of the tool cuts the rail while the lower portion cuts the stile. No portion of the tool cuts both the rail and the stile.

All of these inventions known in the art no doubt perform their intended functions satisfactorily. However, none of the methods or apparatus of the prior art has provided a solution which avoids all the shortcomings described above. Thus there has been a continuing need for an improved method and apparatus for edge-banding plywood.

OBJECTS AND ADVANTAGES OF THE INVENTION

Accordingly, a major object of the invention is a matched set of router bits which make the onerous task of edge-banding plywood quicker and easier. A related object is a method that is relatively inexpensive, requiring only a pair of router bits rather than a new dedicated machine. Another object is a method that uses real wood, so that the edge of the plywood can match, in species and color, the wood being used in other places, such as the face frame of a cabinet. Another object is a method that can use wood, that is normally scrap ripping, for an infill, so that additional expense for materials can be minimized. Another object is avoiding the need to keep supplies of edging in stock, taking up space. A related object is avoiding the inconvenience and delay associated with ordering supplies. Yet another object is a method whose setup is quick and easy for anyone of ordinary skill who has had experience with the operation of a router. The particular design, arrangement and relationships of the elements of the invention provide the following advantages. The design of the router bits gives enough flexibility to allow for various thicknesses in plywood, and for various edge appearances. Because the bearings follow both the top and bottom of the plywood, the plies that are not cut out by the bit can approach a knife-edge shape, resulting in a finished appearance which resembles the edge of a natural board. To further approach a knife-edge shape, a straight-edge guide can easily be clamped exactly along the plywood edge to be finished. The result of this technique is an appearance of a miter between the wood infill and the surface of the plywood. The location of bearings embedded behind the cutting edge prevents the remaining edge of the plywood from getting between the bearing and the cutter. Because of their finished shapes (concave and convex respectively), the mating of the plywood edge and the matching insert is self-aligning. The shapes given to the mating surfaces of the wood increases the surface area of those mating surfaces, resulting in a stronger and more durable glue bond than with a flat joint. The line that results from the union of the wood edging and the plywood occurs very close to, or on, the corner of the two materials. Hence that line is disguised. The meeting of the two materials occurs on the edge instead of on the surface of the material being edged and is thus less subject to physical damage. To one skilled in the art, these and other objects and advantages will be apparent from a reading of the present specification along with the accompanying drawings.

BRIEF SUMMARY OF THE INVENTION

The present invention comprises a matched pair of two cutting tools (bits) adapted to be individually chucked into a common router. Each of these two cutting tools includes a shaft with a removable nut, two or three cutters, one or two bearings, and suitable shims. A first bit (denoted by "Bit 1" in this specification and drawings) has cutters shaped to remove material from the edge of plywood that requires a finished appearance, to form a rounded concave dado in the plywood edge. A second bit (denoted by "Bit 2" in this specification and drawings) has cutters shaped to form a mating wood insert having a rounded convex shape that matches the rounded contour of the concave dado in the plywood edge. The mating wood insert is glued into the dado in the plywood to complete the finished edging.

BRIEF DESCRIPTION OF THE DRAWINGS

FIG. 1 shows an exploded perspective view of the bit that plows the edge of the plywood. Hereinafter this bit will be referred to as Bit 1.

REFERENCE NUMERALS IN DRAWINGS

10—the shaft of Bit 2
12—the shaft of Bit 1
20—the bearing of Bit 2
25—the bearings of Bit 1
30—the top cutter of Bit 2
31—the bottom cutter of Bit 2
35—the top cutter of Bit 1
36—the center cutter of Bit 1
37—the bottom cutter of Bit 1
40—the nut for both Bits 1 & 2
50—the shims which adjust the space between the cutters
60—negative 3/16" profile of cutters 30 & 31
61—positive 3/16" profile of cutters 35 & 37
62—profile of cutters 35 & 37 which accept the bearings 25
80—the wood insert formed by Bit 2 in the 5/8" configuration
81—the plywood edge formed by Bit 1 in the 5/8" configuration
84—the wood insert formed by Bit 2 in the 3/4" configuration
85—the plywood edge formed by Bit 1 in the 3/4" configuration

DETAILED DESCRIPTION OF THE PREFERRED EMBODIMENT

Figure 1:
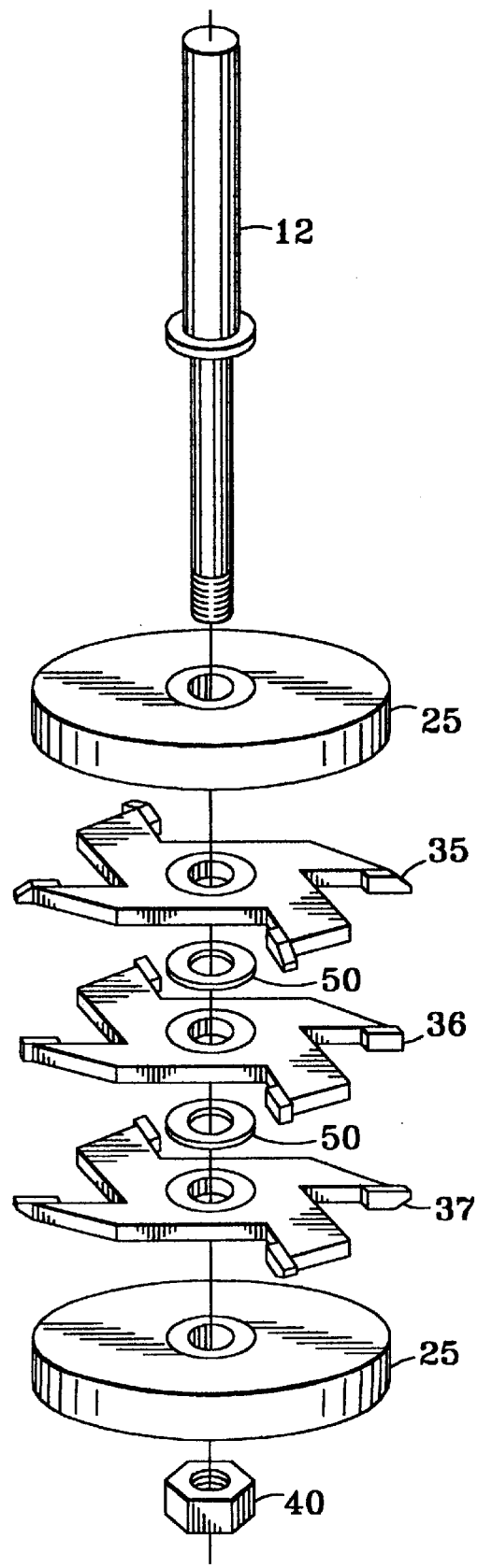
FIG. 1 shows an exploded perspective view of the bit that plows the edge of the workpiece.
Figure 1B:
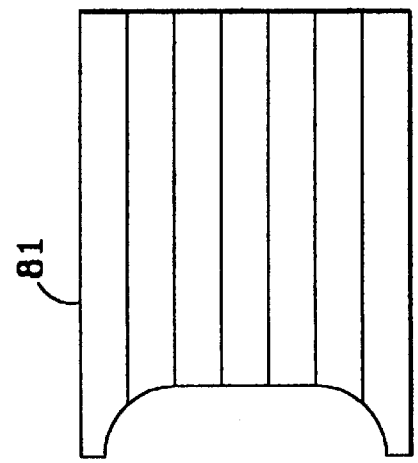
FIG. 1b shows its resulting cut.
Figure 1A:
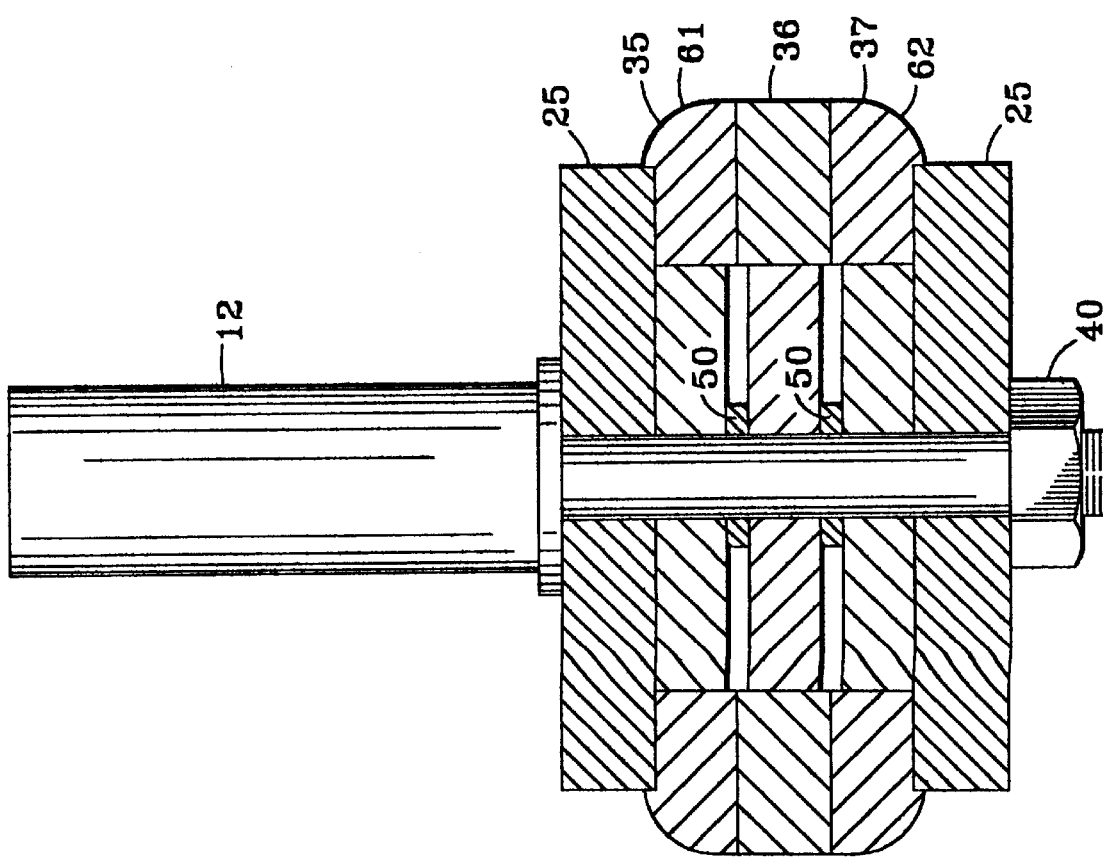
FIG. 1a shows a cross-sectional side elevation view of a first bit made in accordance with the invention.
Figure 2:
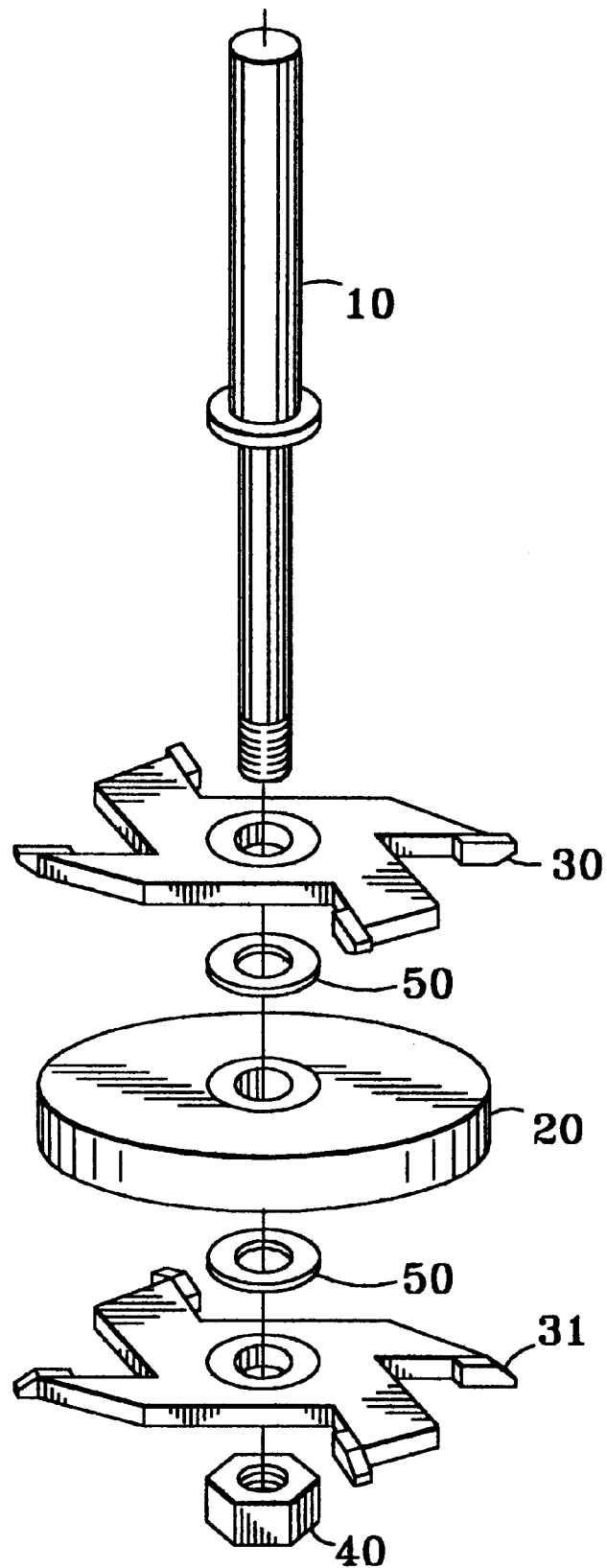
FIG. 2 shows an exploded perspective view of the bit that forms the wood insert. Hereinafter this bit will be referred to as Bit 2.
Figure 2B:
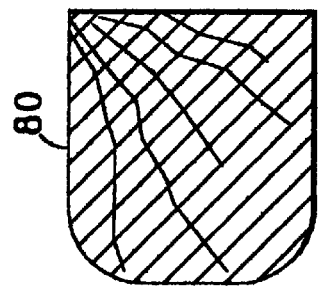
FIG. 2b shows its resulting cut.
Figure 2A:
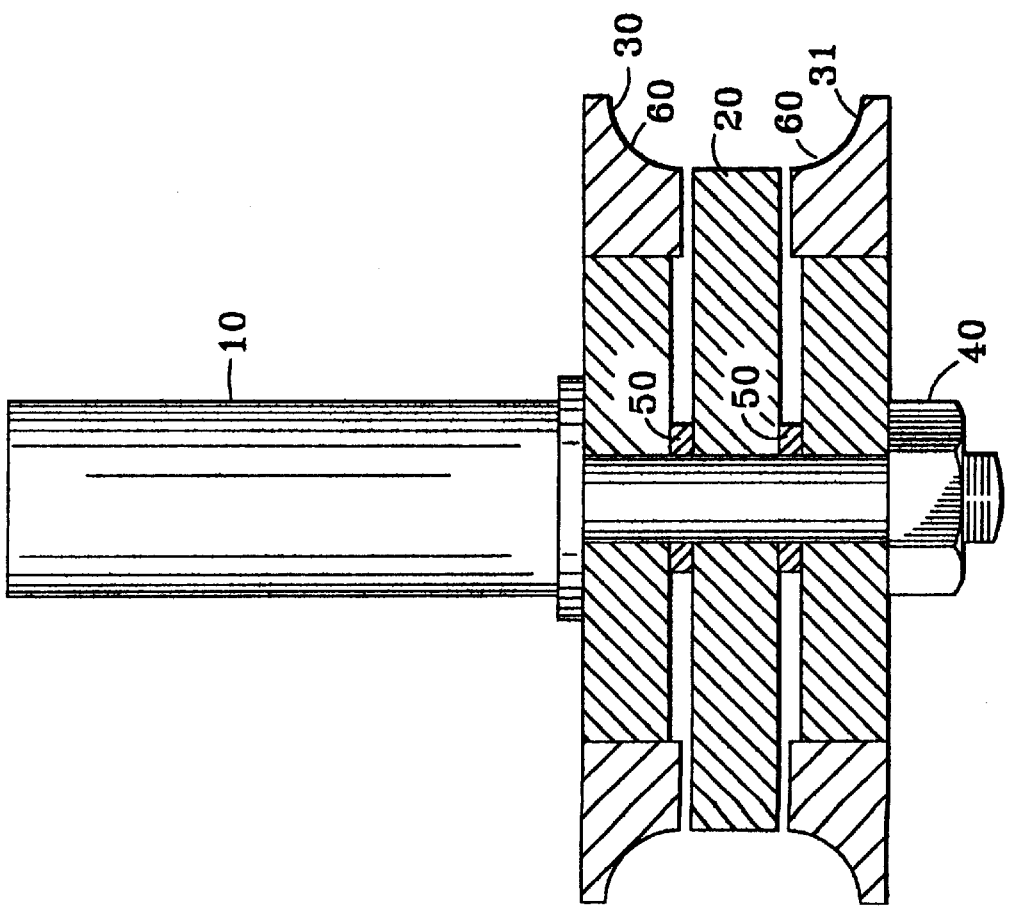
FIG. 2a shows a cross-sectional side elevation view of a second bit made in accordance with the invention.

As shown in the drawings, FIG. 1 and FIG. 1a, are two different depictions of the Bit 1. FIGS. 2 and 2a show the herein after referred to as Bit 2.

Both Bit 1 and Bit 2 have a shaft, 12 & 10 respectively, upon which the cutters, bearings and shims are mounted. These shafts are made of tool steel of any appropriate strength and hardness that satisfy the requirements for a high-speed cutting tool. The shafts are divided into two distinct sections of approximately the same length. The top section is the end that fits into the router. It is 1/2" in diameter and approximately 1 3/4" long to the bottom of the shoulder. The bottom section has a threaded end to receive a nut. None of the mentioned measurements are crucial to the operation of the tool.

Bit 2 has two cutters 30 & 31. Each cutter consists of a steel body with 4 wings tipped with a carbide cutting profile 60. The body of the cutters is approximately 3/16" and is made of steel. Cutter 30 is the horizontal mirror image of cutter 31.

The profile 60 is a negative 3/16" radius. This 3/16" profile allows Bits 1 & 2 to be adjusted, with the shims 50, to cut an insert between 5/8" and 3/4" depending on the application.

The bearing 20 is 1/4" thick. The 1/4" thick bearing stacked tightly with the cutters, which have a 3/16" profile, will cut a 5/8" insert. The shims 50 can be any size and quantity that enable the full range of applications to be achieved.

Bit 1 has three cutters 35, 36, and 37. All three cutters have the same outside diameter. Each cutter consists of a 3/16" steel body with 4 wings tipped with carbide. Cutter 36 has a tip, 1/4" in height, which is ground to a straight cutting edge. Cutters 35 and 37 have carbide tips 1/4" in height, the corner of which are ground to profile 61. The profile 61 is a positive 3/16" radius. Cutter 35 is the horizontal mirror image of cutter 37.

Profile 62 is ground into the top of cutter 35 and the bottom of cutter 37 in order to enable the bearings 25 to be behind the cutting profile 61. This configuration keeps the thin edge of the uncut plywood, on which the bearings 25 are riding, from being pulled between the cutter and the bearing.

The bearings 25 are 3/16" smaller in radius than the cutters 35, 36, and 37 and do not have a specific thickness. The cutters 35, 36, and 37 have a 3/16" steel body, which enables them to be stacked, with appropriate shims 50, to accomplish the full range of applications from 5/8" to 3/4". Because the carbide height is 1/4", the carbide tips are staggered in the 5/8" configuration. In the 3/4" configuration, the tips remove all the unwanted material. These dimensions 5/8" and 3/4" refer to the total width of the rounded dado removed from the plywood edge, as well as its matching infill.

OPERATION OF THE INVENTION

To use the invention, Bit 1 or Bit 2, in sequence, are chucked into a common router and adjusted so the centerline of the bit configuration and the centerline of the material being shaped coincide. The bits can also be used in a router table or a shaper. The router or shaper is then operated in the normal fashion. Bit 1 is used to create a rounded dado in a plywood edge. Bit 2 is used to form a matching insert. The insert is glued to the plywood dado with clamps. The excess material of the insert can then be sawed even with the uncut edge of the plywood. The finished edge of the workpiece can be joined.

Figure 3:
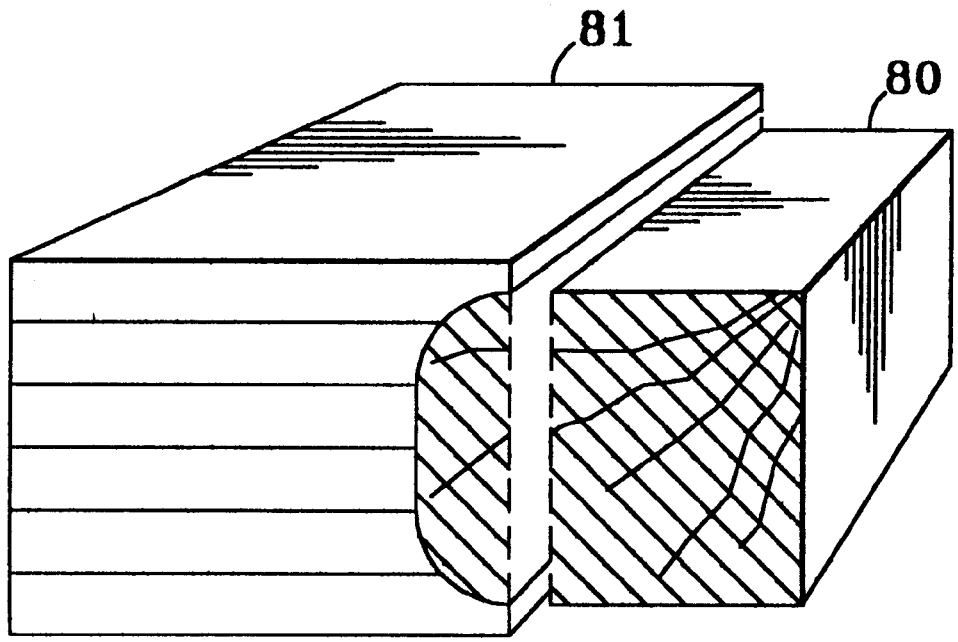
FIG. 3 shows the resulting workpieces, in the 5/8" configuration, joined and sawed flush with the uncut plywood edge. Please note the 1/16" shoulder of the uncut plywood.
Figure 3A:
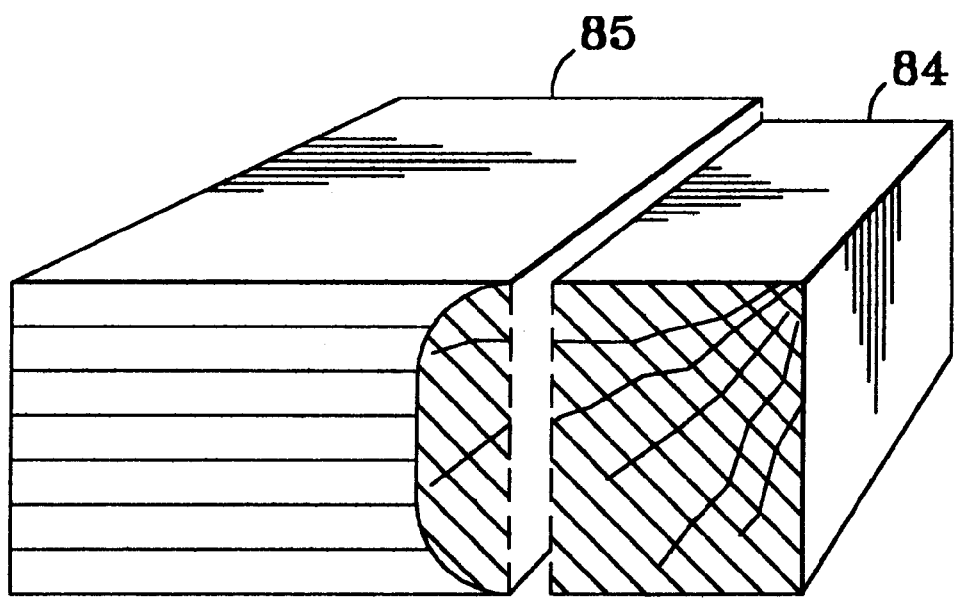
FIG. 3a shows the resulting workpieces, in the 3/4" configuration, joined and sawed flush with the uncut plywood edge. Please note the knife-edge of the uncut plywood.

There are two extreme configurations, 5/8" FIG. 3 and 3/4" FIG. 3a, to which Bits 1 & 2 can be adjusted. Between these sizes, there are many possibilities, limited only by the thickness of the shims 50.

The 5/8" FIG. 3 configuration is the application that requires the least set up and yet still results in a good appearance. Consequently, this configuration will be the way the invention will commonly be used. In this configuration, it is not necessary to clamp a straightedge guide to the plywood. The bearings of Bit 1 will follow the uncut portion of the plywood edge.

However, for a more refined appearance, Bits 1 & 2 can be expanded with shims 50 to ¾" as shown in FIG. 3a. When the Bits 1 & 2 are adjusted to this width, the uncut portion of the plywood approaches a knife edge, and the insert appears to be mitered with the surface of the plywood. To accomplish this, when using Bit 1, it is necessary to use a straightedge guide clamped directly along the plywood edge to be finished. This guide gives the bearings 25 a surface to ride against. Bit 2 does not require this aid.

CONCLUSIONS, RAMIFICATIONS, AND SCOPE OF INVENTION

It should be clear to the reader at this point that this invention will change the task of edging plywood into a fast, and easy process that will result in a better looking and more durable finished product than the currently used methods.

While my above description contains many specificities, these should not be construed as limitations on the scope of the invention, but rather as an exemplification of one possible embodiment thereof.

For example:
a. The profiles 60 & 61 do not have to be this specific shape or size.
b. The router shaft could be ¼" with a smaller cutting head.
c. Bits 1 & 2 could be manufactured in solid form in one configuration or another so they were not adjustable.
d. All bearings 20 & 25 could be rub collars.
e. Profile 62 could be eliminated or changed.
f. The invention could be configured to plywood thickness other than ¾"
g. Any or all dimensions used in the preferred embodiment could change without affecting the function of the tool.
h. The invention could also be configured to be a shaper tool.
i. The invention could be used on wood products other than plywood and could be used for decorative reasons on natural wood.

Accordingly, the scope of the invention should be determined not by the embodiment(s) illustrated, but by the appended claims and their legal equivalents.

Having described my invention, I claim:

1. A complementary pair of rotational machine tools for use in finishing an edge of a wooden article, comprising:
   a) a first, positive-profile bit for removing wood from said edge to form a tapered dado in said edge of said article, and
   b) a second, negative-profile bit for shaping an insert to adapt said insert for nesting in said tapered dado, said negative-profile bit having a profile complementary to said positive-profile bit.

2. Rotational machine tool apparatus for use in finishing an edge of a generally planar wooden article having a thickness and an edge, said apparatus comprising a pair of bits, characterized in that said pair of bits has cutting portions having complementarily matched contours, including a first bit for shaping said edge of said wooden article to form a shaped edge, and a second bit for shaping an insert for fitting against said shaped edge.

3. Apparatus as in claim 2 wherein said first bit has a substantially convex contour.

4. Apparatus as in claim 2 wherein said second bit has a substantially concave contour.

5. Rotational machine tool apparatus for use in finishing an edge of a generally planar wooden article having a thickness and an edge, said apparatus comprising in combination:
   a) a first bit comprising a first cutting portion shaped with a positive contour for removing wood to form a tapered dado in said edge of said wooden article, said first cutting portion having an axial dimension less than said thickness of said wooden article by a predetermined amount; and
   b) a second bit comprising a second cutting portion shaped with a negative contour for shaping an insert, said negative contour of said second cutting portion complementarily matching said positive contour of said first bit so that said insert nests into said tapered dado.

6. Apparatus as in claim 5, wherein said predetermined amount is greater than or equal to zero.

7. Apparatus as in claim 5, wherein said planar wooden article is plywood having an outer ply, said outer ply having an outer ply thickness, and wherein said predetermined amount is less than or substantially equal to said outer ply thickness.

8. Apparatus as in claim 5 wherein said first bit further comprises a first shaft and said second bit further comprises a second shaft, each shaft being provided for chucking in rotating machinery.

9. Apparatus as in claim 8, wherein said rotating machinery is a router.

10. Apparatus as in claim 8, wherein said first and second shafts have equal diameters.

11. Apparatus as in claim 5 wherein each of said first and second bits further comprises a bearing.

12. Apparatus as in claim 5 wherein said first bit comprises two cutters.

13. Apparatus as in claim 5 wherein said first bit comprises three cutters.

14. Apparatus as in claim 5 wherein said second bit comprises two cutters.

15. Apparatus as in claim 5 wherein said second bit comprises three cutters.

16. Apparatus as in claim 5 wherein said first bit further comprises a removable nut.

17. Apparatus as in claim 5 wherein said second bit further comprises a removable nut.

18. Apparatus as in claim 11 wherein said bearing of said first bit is disposed to prevent any uncut edge of said wooden article from fitting between said first cutting portion and said bearing of said first bit.

19. Apparatus as in claim 11 wherein said bearing of said second bit is disposed to prevent any uncut edge of said wooden article from fitting between said second cutting portion and said bearing of said second bit.

20. A method of finishing an edge of plywood having a thickness, two major surfaces, and an edge, said method comprising the steps of:
   a) forming a concave dado into said edge of said plywood by routing said dado using a first bit having a convex curved first contour,
   b) providing a wooden workpiece,
   c) forming a convex portion on said wooden workpiece, by shaping said workpiece using a second bit having a concave curved second contour complementary to said convex curved first contour to provide an insert having a convex portion complementary to said concave dado formed into said edge of said plywood, d) placing said convex portion of said insert into said concave dado, and e) adhering said insert to said plywood edge using an adhesive disposed between said insert and said plywood, thereby forming a finished edge on said plywood.

21. A method as in claim 20, wherein said concave dado is formed with a rounded contour.

22. A method as in claim 20, said plywood consisting of at least a top outer ply, a bottom outer ply, and one or more interior plies, wherein said concave dado is formed with a width extending at least into both said top outer ply and said bottom outer ply.

23. A method as in claim 20, further comprising the step of selectively removing material from said insert adjacent to each of said major surfaces of said plywood while trimming said insert to align with said major surfaces of said plywood.

24. Apparatus for replacing material at an edge of a wooden article having a thickness without increasing the original size of the wooden article, said apparatus comprising:

a) a first cutter, said first cutter including a first cutting portion with a convex contour for forming a shaped recess in said edge of said wooden article, said first cutting portion having an axial dimension less than said thickness of said wooden article, and b) a second cutter, said second cutter including a second cutting portion with a concave contour for forming a wooden insert for fitting into said shaped recess, said concave contour being complementary to said convex contour of said first cutting portion of said first cutter.

25. Apparatus for finishing an edge of plywood having a thickness, two major surfaces, and an edge, said apparatus comprising a pair of router bits, said pair consisting of:

a) a first router bit having a first shaft and a convex cutting contour, said convex cutting contour having an axial dimension less than said thickness of said plywood by an amount, said first router bit further comprising two or more stacked first cutters for cutting a concave dado into said edge of said plywood between said two major surfaces, and b) a second router bit having a second shaft and a concave cutting contour, said concave cutting contour having an axial dimension substantially equal to the axial dimension of said first router bit, said second router bit further comprising two or more stacked second cutters, and said concave cutting contour being complementary to said convex cutting contour of said first router bit, said second router bit being operable to shape an insert having a convex insert portion fitting snugly into said concave dado, whereby said insert may be used to finish said edge of said plywood.

* * * * *